US 9,300,131 B2

(12) United States Patent
Gertmar et al.

(10) Patent No.: US 9,300,131 B2
(45) Date of Patent: Mar. 29, 2016

(54) INTERNAL ELECTRIFICATION SCHEME FOR POWER GENERATION PLANTS

(75) Inventors: Lars Gertmar, Vasteras (SE); Dennis Kron, Untersiggenthal (CH); Jiuping Pan, Raleigh, NC (US); Yao Chen, Beijing (CN); Richard W. Vesel, Hudson, OH (US); Arash A. Babaee, Mississauga (CA)

(73) Assignee: ABB Research Ltd., Zurich (CH)

( * ) Notice: Subject to any disclaimer, the term of this patent is extended or adjusted under 35 U.S.C. 154(b) by 20 days.

(21) Appl. No.: 13/309,201

(22) Filed: Dec. 1, 2011

(65) Prior Publication Data
US 2012/0181862 A1    Jul. 19, 2012

Related U.S. Application Data

(63) Continuation of application No. PCT/US2009/045795, filed on Jun. 1, 2009.

(51) Int. Cl.
*H02J 3/18* (2006.01)
*H02J 1/10* (2006.01)

(52) U.S. Cl.
CPC . *H02J 1/102* (2013.01); *H02J 3/18* (2013.01); *Y10T 307/336* (2015.04)

(58) Field of Classification Search
CPC .......................................................... H02J 3/18
USPC .................................................... 307/19–21
See application file for complete search history.

(56) References Cited

U.S. PATENT DOCUMENTS

| | | | | |
|---|---|---|---|---|
| 3,593,103 | A * | 7/1971 | Chandler et al. | 363/174 |
| 4,967,135 | A * | 10/1990 | Ashikaga et al. | 318/808 |
| 6,184,593 | B1 * | 2/2001 | Jungreis | 307/64 |
| 6,362,540 | B1 * | 3/2002 | Hill | 307/52 |
| 6,486,568 | B1 * | 11/2002 | King et al. | 307/66 |
| 6,742,630 | B2 * | 6/2004 | Eilinger | 187/290 |
| 6,812,586 | B2 * | 11/2004 | Wacknov et al. | 290/52 |
| 6,958,550 | B2 * | 10/2005 | Gilbreth et al. | 290/52 |
| 7,176,648 | B2 * | 2/2007 | Choi | 318/625 |

(Continued)

FOREIGN PATENT DOCUMENTS

| | | |
|---|---|---|
| CN | 1239909 A | 12/1999 |
| DE | 19653182 A1 | 6/1998 |

(Continued)

OTHER PUBLICATIONS

International Preliminary Report on Patentability; Application No. PCT/US2009/045795; Issued: Dec. 6, 2011; 12 pages.

(Continued)

*Primary Examiner* — Adi Amrany
(74) *Attorney, Agent, or Firm* — Whitmyer IP Group LLC

(57) ABSTRACT

An apparatus for use in an electrical power generation plant. The apparatus includes: at least two adjustable speed drives, each connected, on an alternating current side, to an associated auxiliary motor; at least one reactive power consuming auxiliary device connected to an alternating current bus; a controller; a converter for converting alternating current to direct current or vice versa between the alternating current bus and a direct current bus; and at least one electrical power source arranged to provide power to the direct current bus. Each of the at least two adjustable speed drive is connected, on a direct current side, to the direct current bus.

15 Claims, 5 Drawing Sheets

(56) References Cited

U.S. PATENT DOCUMENTS

| | | | |
|---|---|---|---|
| 8,008,804 B2* | 8/2011 | Capp et al. | 307/44 |
| 8,008,808 B2* | 8/2011 | Seeker et al. | 307/72 |
| 8,244,419 B2* | 8/2012 | Wegner-Donnelly et al. | 701/21 |
| 8,330,291 B2* | 12/2012 | Kumar | 307/9.1 |
| 2003/0007369 A1* | 1/2003 | Gilbreth et al. | 363/35 |
| 2004/0201354 A1 | 10/2004 | Holden | |
| 2005/0077881 A1* | 4/2005 | Capp et al. | 322/29 |
| 2006/0061307 A1* | 3/2006 | Donnelly | 318/108 |
| 2006/0290317 A1* | 12/2006 | McNulty et al. | 318/801 |
| 2007/0273213 A1* | 11/2007 | Wang et al. | 307/66 |
| 2008/0103632 A1* | 5/2008 | Saban et al. | 700/286 |
| 2010/0177452 A1* | 7/2010 | Wei et al. | 361/111 |
| 2012/0292992 A1* | 11/2012 | Williams | 307/23 |

FOREIGN PATENT DOCUMENTS

| | | | | |
|---|---|---|---|---|
| JP | 2008148376 A | * | 6/2008 | |
| WO | 9917426 A2 | | 4/1999 | |
| WO | WO 9917426 A2 | * | 4/1999 | H02K 3/40 |

OTHER PUBLICATIONS

Duchon, et al.; "Experience with the Connection of Large Variable Speed Compressor Drives to HV Utility Distribution Systems"; IEEE Transactions on Power Systems, vol. 15, No. 1; Feb. 2000; pp. 455-459.

International Search Report and Written Opinion of the International Searching Authority; Application No. PCT/US2009/045795; Issued: Jun. 14, 2011; Mailing Date: Jul. 7, 2011; 12 pages.

ABB; "Power Generation Energy Efficient Design of Auxiliary Systems in Fossil-Fuel Power Plants"; Apr. 12, 2009; retrieved from Internet: http://www05.abb.com/global/scot/scot221.nsf/veritydisplay/2cfc30641b9c3e4bc12577b60022a8a4/$file/energy%20efficiency%20for%20power%20plant%20auxiliaries-v2_0.pdf; 64 pages.

The Patent Office of the People's Republic of China First Office Action Application No. 200980159577.4 Issued: Nov. 12, 2013 9 pages.

* cited by examiner

INTERNAL ELECTRIFICATION SCHEME FOR POWER GENERATION PLANTS

CROSS-REFERENCE TO RELATED APPLICATIONS

The present application is a continuation of pending International patent application PCT/US2009/045795 filed on Jun. 1, 2009 which designates the United States and the content of which is incorporated herein by reference.

FIELD OF THE INVENTION

The present invention relates generally to electrical power generation plants, and more particularly to distributing and controlling power consumption in auxiliaries of electrical power generation plants to increase plant effectiveness and energy efficiency.

BACKGROUND OF THE INVENTION

Thermal power generation plants remain one of the main means for generation of electricity, in e.g. fossil fuelled plants and nuclear plants. It is estimated that up to 8 to 10 percent of its generated power is consumed for its internal electric consumption in so-called auxiliary loads. The auxiliary loads comprise e.g. fans, compressors, pumps, that are necessary for the operation of the plant, performing tasks such as feeding water, feeding air for combustion, transport of fuel and waste, etc.

In a typical large scale plant, the most energy consuming loads are fan, pump and compressor drives, typically rated 1-5 MW and consuming 5 to 40 GWh per year. In view of demands for energy efficiency it would be beneficial to provide more power with the same $CO_2$ emission. Consequently, it is desirable to reduce the power consumption of the auxiliary loads. Not only reduction of active power consumption would be beneficial; it would also be beneficial to avoid distributing reactive power consumption over the whole plant, making reactive power local, and thus reducing distribution losses in cables.

SUMMARY OF THE INVENTION

An object of the present invention is to provide an apparatus to avoid distributing reactive power consumption over the whole plant, making reactive power local and reducing distribution losses in cables required for auxiliaries of an electrical power generation plant.

Another object is to significantly reduce the dependency of external alternating current for auxiliary power distribution.

According to the invention there is provided an apparatus for use in an electrical power generation plant. The apparatus comprises: at least two adjustable speed drives, each connected, on an alternating current side, to an associated auxiliary motor; at least one reactive power consuming auxiliary device connected to an alternating current bus; a controller; and a converter for converting alternating current to direct current or vice versa between the alternating current bus and a direct current bus; at least one electrical power source arranged to provide power to the direct current bus; and wherein each of the at least two adjustable speed drives are connected, on a direct current side, to the direct current bus.

This allows for reactive power to be separated from the main generator, resulting in reduced reactive power consumption of the main generator of the plant. This results in the main generator being able to produce more active power, which increases the output of the power generation plant. Moreover, harmonic sources, at least those connected to the DC bus via converters, are isolated, which simplifies installation and reduces harmonic complexities such as AC (alternating current) resonances, harmonic losses, etc. Moreover, since the AC bus is powered from the DC bus, no costly transformer is required on a line from the main power line. Due to the plurality of power sources for the auxiliaries, the auxiliaries are less likely to fail, which increases the security of the supply of power of the power generation plant.

The at least one electrical power source may comprise a variable speed drive steam turbine generator. The steam turbine generator can act both as a load and a power source.

The at least one electrical power source may comprise a high inertia fan. The high inertia fan can also act both as a load and a power source, at least during temporary dips in voltage on the DC bus.

The at least one electrical power source may comprise a start up source for the electrical power generation plant.

The at least one electrical power source may comprise a tertiary winding of a main generator of the electrical power generation plant. Using the tertiary winding and a connected converter, the reactive power of the entire power generation plant can be controlled using a converter between the tertiary winding and the direct current bus.

The at least one electrical power source may generate electricity from rotating kinetic energy.

The at least one electrical power source may generate electricity from rotating kinetic energy from a fan.

The controller may be configured to control the at least one electrical power source to thereby control a voltage of the direct current bus.

The controller may be configured to control at least one electrical power source of a plurality power sources to thereby control the voltage of the direct current bus.

The apparatus may further comprise switchgears provided on the alternating current sides of each of the at least two adjustable speed drives.

The apparatus may comprise two direct current buses, each direct current bus being configured according to the direct current bus of an apparatus for use in an electrical power generation plant.

Each of the direct current buses may be connected to a common alternating current bus.

Generally, all terms used are to be interpreted according to their ordinary meaning in the technical field, unless explicitly defined otherwise herein. All references to "a/an/the element, device, component, means, step, etc." are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION OF THE INVENTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
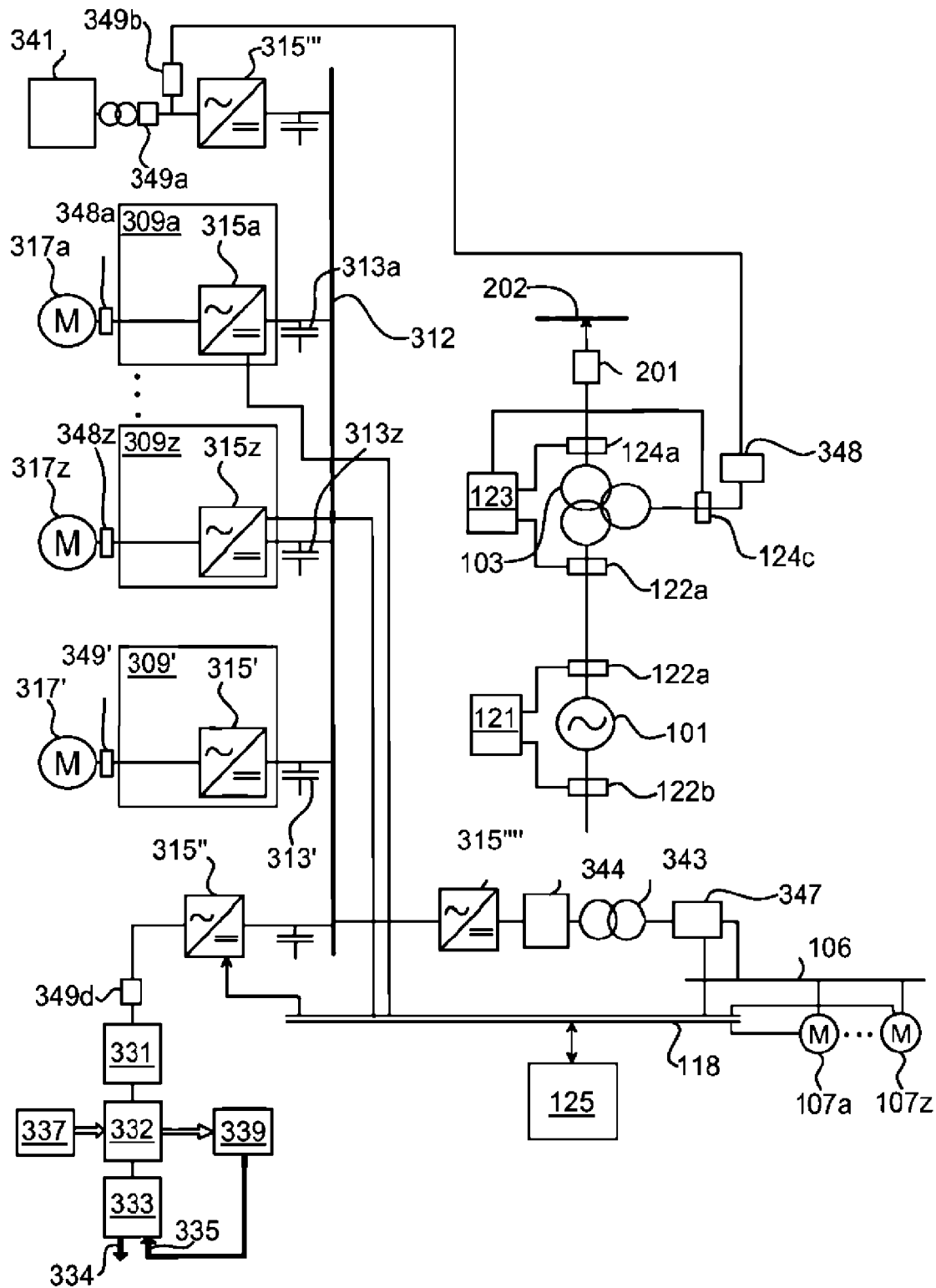
FIG. 1 is a schematic diagram illustrating the use of an embodiment of the present invention with a DC bus.

FIG. 1 is a schematic diagram illustrating the use of an embodiment of the present invention with a DC bus. The DC bus is connected to the AC bus 106 for auxiliaries via a converter 315"" and an optional transformer 343. Power can flow in both directions between the AC bus 106 and the DC bus 312. A switchgear 344 can be provided on either side of the transformer 343. Optionally, a filter 347 is provided to make the power on the AC bus 106 more sinusoidal.

The AC bus is thus only powered from the DC bus, whereby there is no reactive power that is drawn from the main generator. Even if the DC bus is powered from the main line, since there is a conversion to and from DC, there is no reactive power consumption. In systems known in the art, where power is drawn from the main generator line, there can be significant reactive power consumption from the main generator line.

A number of adjustable speed drives 309a-z, also known as variable speed drives, are also connected to the DC bus 312, in order to obtain electrical power from the DC bus 312 to drive respective associated loads 317a-z, such as motors for fans, pumps, etc. These motors are used for auxiliary loads. In this embodiment, each adjustable speed drive 309a-z comprises an inverter 315a-z and each adjustable speed drive is also connected to a capacitor 313a-z, to filter out high frequency components which could otherwise be transferred to the DC bus 312.

The DC bus is also connected to switchgears 349a-b via a converter 315'''. The switchgears 349a-b can on one hand be connected to a start-up source 341. The start-up source is used for when the electrical power generation plant is started and can for example be a diesel generator or a secondary electric network, optionally connected via a transformer. On the other hand, the switchgears 349a-b can be connected to the main generator 101 via tertiary winding 103. Here, a fault current limiter 348 is provided to protect from fault currents. It is to be noted that electrical energy can flow in both ways from the DC bus 312 through the converter 315''', as controlled by the controller 125. Hence, reactive power between to or from the transformer 103 can be controlled.

Looking at the AC bus 106 for the auxiliaries 107a-z, in the prior art, this is typically connected to the output of the generator 101, e.g. between the sensors 122a and 124b. This necessitates a switchgear between the generator 101 and the transformer 103 to be able disconnect the spur to the AC bus. In this embodiment, the switchgear 349b is instead provided at desired voltage, for the spur, whereby a switchgear 201 can be placed between the transformer 103 and a connected transmission grid 202. By placing the switchgear 201 at the higher voltage, the current through the switchgear 201 is reduced, which significantly reduces the cost, compared to requiring a switchgear between the generator 101 and the spur connected to the transformer 103.

Furthermore, a variable speed generator 331 is connected to the DC bus 312 via a converter 315". The generator is connected to a 1 step or 2 step steam turbine 332 which receives extraction steam 337 and provides steam to an (auxiliary) condenser 339. The steam turbine 332 is also connected to a feed water pump 333. The feed water pump is connected to an inlet 335 and outlet 334. With this arrangement, the generator can convert energy in the form of steam pressure to electrical energy, which is converted to DC by the converter 315" to the DC bus 312. The generator can also work in reverse by acting as a motor, collecting electrical energy from the DC bus 312 which is converted to AC via the converter 315". The generator/motor 331 then uses the steam turbine 332 to increase torque to a pump from the torque available at low steam pressure. In other words, it is provided a two-way (reversible) converter between electrical DC energy and torque and speed for a pump, allowing the steam pressure to act as one source of energy storage. The steam can be connected in various ways, e.g. to obtain for suitable pressure.

A high inertia fan 317', which in itself is an auxiliary load, is connected via an adjustable speed drive 309' to the DC bus 312, with a capacitor 313'. The adjustable speed drive contains an inverter 315'. Due to the inertia of the fan, the rotational kinetic energy can serve as power source and can be converted to electric energy which is converted by the converter 315' to DC and supplied to the DC bus 312. Hence, the fan can also serve as a power source, using energy stored as rotational kinetic energy in the fan as a temporary energy storage. Since the fan 317' is connected to the DC bus 312 via its own adjustable speed drive 309', on start-up, the fan is suitably controlled via the adjustable speed drive 309'.

With this arrangement, the controller 125 can control the voltage of the DC bus 312 using a number of different components. There are a number of power sources, in this example five power sources: the generator 331, the fan 317', the start-up source 341, the main transformer 103 and the AC bus 106'. Moreover, the adjustable speed drives 309a-z can also be controlled. This provides great flexibility of power consumption and/or production. For example, reactive power usage of the auxiliaries of the plant can be controlled, and active power can be controlled with great flexibility. This can assist in providing the requested power during normal operation or it can provide additional power sources during emergency situations. Moreover, using more than one power source for the DC bus gives a redundancy in case any power source fails.

It is to be noted that all power sources are not necessary; any suitable combination of power sources can be used.

In one embodiment, sensors are arranged to provide signals containing a reactive power to the controller 125. For example, there can be three sensors 124a, 124b, 124c which can measure a reactive power produced by the entire power generating plant and reactive power transferred on the tertiary winding. The sensors 124a-c can for example comprise a voltmeter, amperemeter and phase meter for deriving the reactive power. In this embodiment, the sensors 124a-c are comprised in a device 123 for protection of the main transformer 103. It is to be noted that for the sensors 124a-c to be able to measure the reactive power, only one of the sensors 124a-c is needed, not necessarily two or three as shown in FIG. 1; more sensors provide an ability to detect faults in windings of the transformer and also provides redundancy. The sensors 124a-c send a signal to the controller 125. This allows the controller 125 to, for example, adjust the converter 315''' such that a desired reactive power of the entire power generating plant is achieved (within a margin of error). This desired reactive power could be a set value, either as commanded from a plant operator, either independently or as a result of a command from a transmission system operator. In one example, the desired reactive power out to the transmission network 202 can be zero. In other words, only active power is output from the plant. The reactive power can be a result of desired voltage control of the power generating plant.

Alternatively or additionally, a second set of sensors 122*a-b* measures a reactive power of the main generator 101 and supplies this in a signal to the controller 125. These sensors 122*a-b* can be embodied in a device 121 for protection of the main generator 101.

Optionally, all sensors 122*a-b*, 124*a-c* are connected to the internal power buses using transformers, for added security.

Optionally, all sensors 122*a-b*, 124*a-c* can communicate with controller 125 over a data bus 118, simplifying connection between the sensors 122*a-b*, 124*a-c* and the controller 125. Additionally, the signals from the controller to the adjustable speed drives 309*a-z* can be sent over the same data bus 118, or a different data bus (not shown). The data bus 118 can be two physical buses for redundancy purposes.

In this embodiment, switchgears 348*a-z*, 349*a-d* are provided on the AC side of the converters. Optionally, the converters comprise circuit breakers that can be used when the converters are unloaded.

Figure 2:
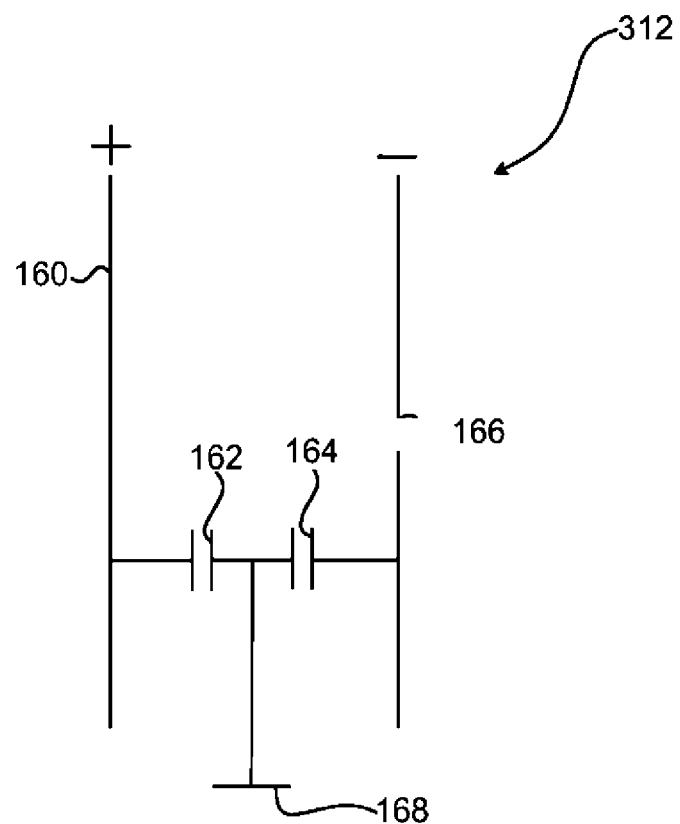
FIG. 2 is a schematic diagram of the DC bus of FIG. 1 in an embodiment of the present invention.

FIG. 2 is a schematic diagram of an embodiment of the DC bus of FIG. 1. The DC bus 312 comprises two lines, a positive line 160 and a negative line 166. The lines are connected two each other via two capacitors 162, 164 in series. In the connection between the two capacitors 162, 164, there is a line to ground 168. With such an arrangement, it is to be noted that the capacitors 313*a-z* of FIG. 1 are not connected directly to ground; they are connected to suit the arrangement of the DC bus 312.

In the present embodiment, at least three phases are used for any alternating current and at least two lines are used for direct current.

Figure 3A:
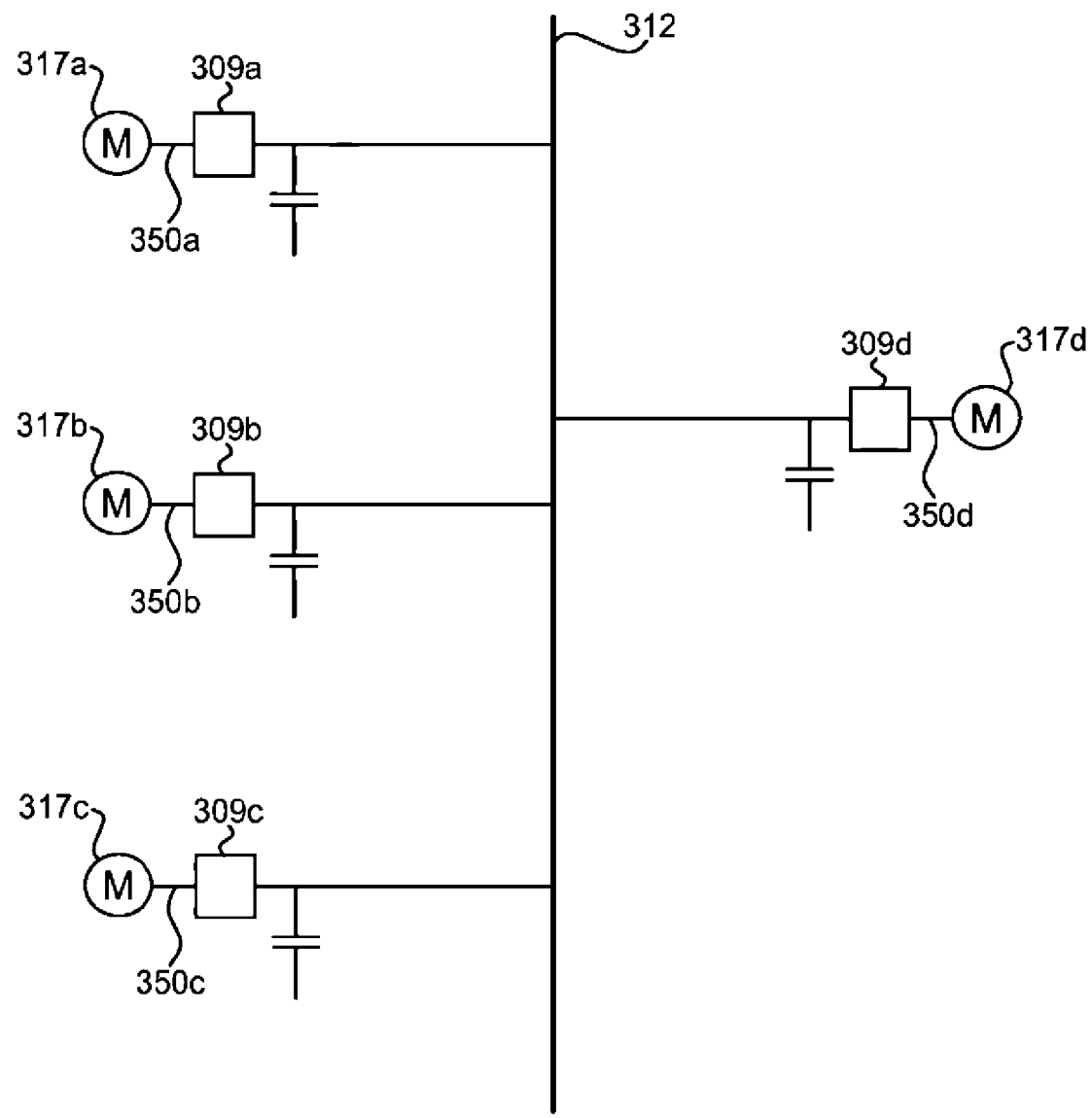
FIGS. 3a and 3b are schematic diagrams illustrating two embodiments of cabling with the DC bus of FIG. 1.

FIG. 3*a* is a schematic diagram showing an embodiment of the DC bus of FIG. 1 where the length of the AC cables for auxiliary motors connected to the power converters is reduced. Components that are not necessary to illustrate the aspects of this embodiment are omitted in order not to obscure and confuse this disclosure. The DC bus 312 is connected via relatively long DC cables to the converters 309*a-d*. This allows each connection 350*a-d* between the converters 309*a-d* and the motors 317*a-d* to be short, at the expense of longer DC cables between the DC bus 312 and the converters 309*a-d*.

For the same power rating, since AC cables have to also carry reactive power while DC cables only carry active power, DC cables can be made thinner than an equivalent AC cable. Consequently, this topology results in a reduced cost for power cables between the bus and ultimately the motors 317*a-d*. Alternatively, the same dimension cables used for DC cables result in lower losses, compared to AC cables.

Figure 3B:
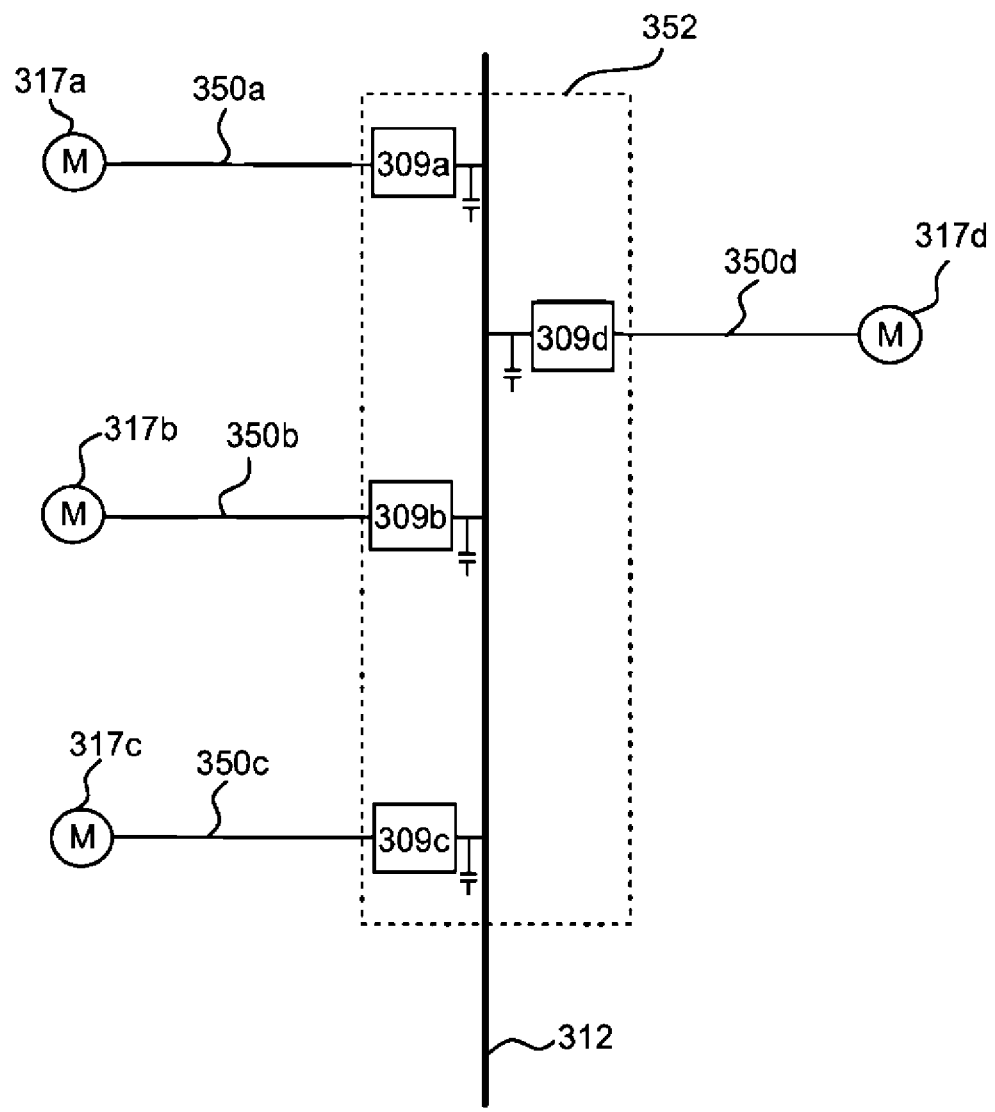

FIG. 3*b* is a schematic diagram showing an embodiment of the DC bus of FIG. 1 where the converters 309*a-d* are centrally located. Components that are not necessary to illustrate the aspects of this embodiment are omitted in order not to obscure and confuse this disclosure. The DC bus 312 is here concentrated to a central location, such as housing 352. Each converter 309*a-d* is located within the housing 352. This results in longer connecting cables 350*a-d* between the converters 309*a-d* and the motors 317*a-d*. While this results in higher cost for connecting cables, installation is simplified by allowing one housing 352 to contain both the DC bus and converters. The housing 352 can be based on one or more intermodal freight shipping container, allowing assembly and initial testing to be performed at the site of the supplier, which reduces complexity and time required to install the DC bus and converters.

Figure 4:
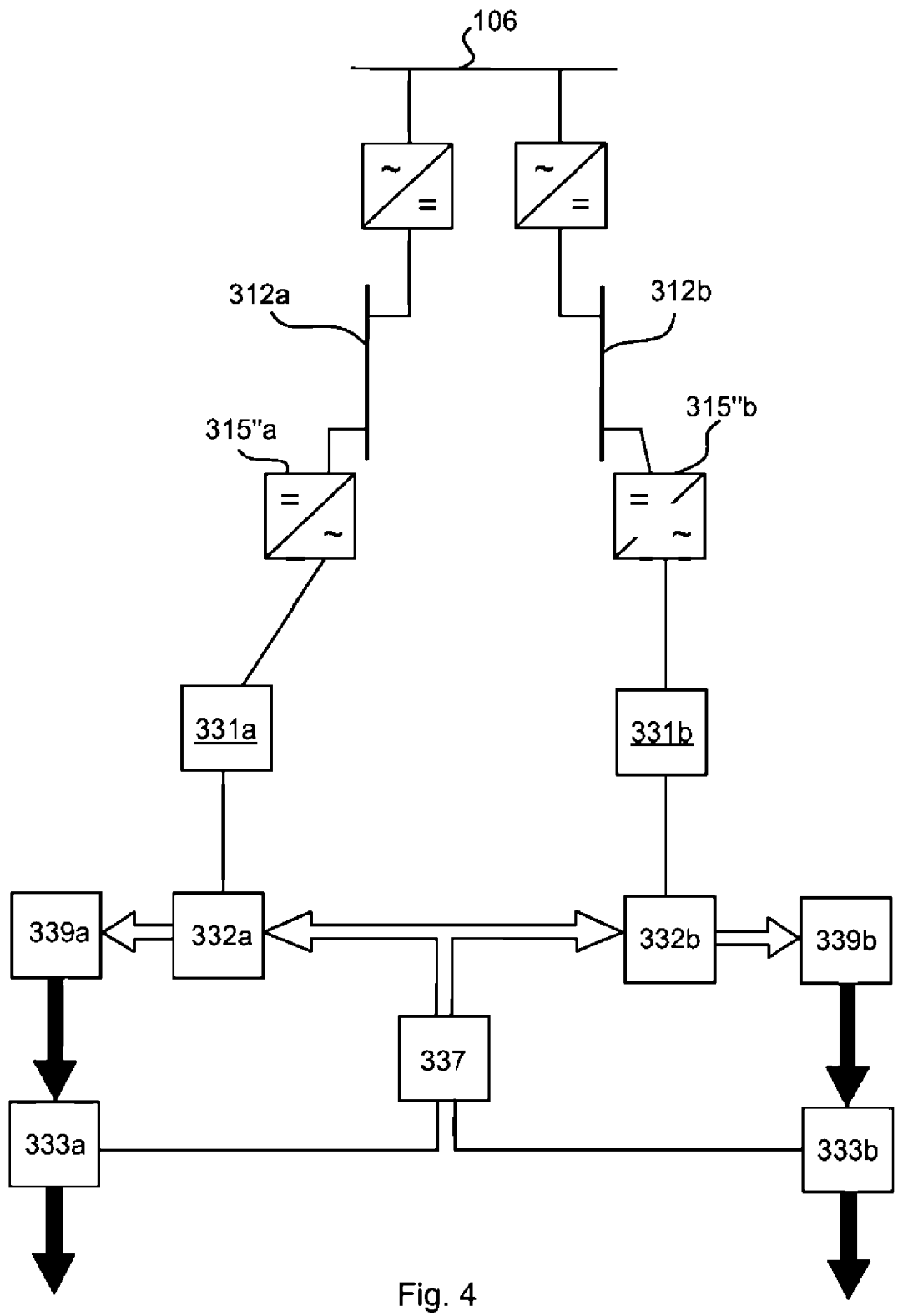
FIG. 4 is a schematic diagram showing an embodiment of the present invention where two DC buses are used.

FIG. 4 is a schematic diagram showing an embodiment of the present invention where two DC buses 312*a-b* are used. The DC buses 312*a-b*, converters 315"*a-b*, variable speed generators 331*a-b*, steam turbines 332*a-b*, condensers 339*a-b*, and water feed pumps 333*a-b* function individually in a way that corresponds to how it is explained above with reference to FIG. 1. Specifically, the DC buses typically have more power sources and power using equipment connected to them, although, for reasons of clarity, this is not shown here. There is one source of steam 337 (although this could be separated into two sources of steam). Similarly, the steam turbines 332*a-b* can be combined in a single steam turbine. The AC bus 106 is connected, via converters to both DC buses. This gives a secure redundant solution.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. An apparatus for use in an electrical power generation plant, said apparatus comprising:
   at least two adjustable speed drives, each connected, on an alternating current side, to a respective auxiliary motor;
   at least one reactive power consuming auxiliary device connected to an alternating current bus;
   a single controller; and
   a bus converter converting alternating current to direct current and vice versa between said alternating current bus and a direct current bus; and
   at least two electrical power sources each coupled to said direct current bus through a respective converter, where both said at least two electrical power sources are configured to provide power to said direct current bus;
   one of said at least two electrical power sources comprises a tertiary winding of a generator of said electrical power generation plant; and
   each of said at least two adjustable speed drives is connected, on a direct current side, to said direct current bus;
   wherein said controller is coupled to said at least two adjustable speed drives, to said at least one reactive power consuming auxiliary device, to at least one of the respective converters coupled to said at least two electrical power sources, and to said bus converter;
   said controller controls the converter coupled to said generator based on a desired reactive power of the electrical power generation plant to reduce distribution of reactive power consumption over the electrical power generation plant.

2. The apparatus according to claim 1, wherein one of said at least two electrical power sources comprises a variable speed drive steam turbine generator.

3. The apparatus according to claim 2, wherein said controller is configured to control said variable speed drive steam turbine generator to thereby control a voltage of said direct current bus.

4. The apparatus according to claim 1, wherein one of said at least two electrical power sources comprises a high inertia fan.

5. The apparatus according to claim 1, wherein one of said at least two electrical power sources comprises a start up source for said electrical power generation plant.

6. The apparatus according to claim 1, wherein one of said at least two electrical power sources generates electricity from rotating kinetic energy.

7. The apparatus according to claim 6, wherein one of said at least two electrical power sources generates electricity from rotating kinetic energy from a fan.

8. The apparatus according to claim 1, further comprising switchgears provided on said alternating current sides of each of said at least two adjustable speed drives.

9. The apparatus according to claim 1, wherein said apparatus comprises two direct current buses.

10. The apparatus according to claim 9, wherein each of said direct current buses is connected to a common alternating current bus.

11. The apparatus according to claim 1 further comprising sensors configured to measure reactive power where said sensor are connected to said controller, and where said controller controls said bus converter to control a level of the reactive power generated.

12. The apparatus according to claim 1, wherein said controller is configured to control one of said at least two electrical power sources to thereby control a voltage of said direct current bus.

13. The apparatus according to claim 12, wherein said controller is configured to control at least one electrical power source of a plurality of power sources to thereby control said voltage of said direct current bus.

14. The apparatus according to claim 1 wherein said controller is configured to control a voltage of the direct current bus.

15. The apparatus according to claim 1 wherein said controller is configured to control the direction of flow of electrical energy through said bus converter.

* * * * *